(12) United States Patent
Low et al.

(10) Patent No.: US 7,073,863 B1
(45) Date of Patent: Jul. 11, 2006

(54) INFINITELY ADJUSTABLE HEAD RESTRAINT ASSEMBLY FOR A VEHICLE SEAT ASSEMBLY

(75) Inventors: Kar K. Low, Southfield, MI (US); Eric Veine, Madison Heights, MI (US); Nagarjun Yetukuri, Rochester Hills, MI (US); Mladen Humer, Eastpointe, MI (US); Dale Smallwood, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/111,446

(22) Filed: Apr. 21, 2005

(51) Int. Cl.
  *B60R 22/28* (2006.01)
(52) U.S. Cl. .......................... 297/404; 297/391
(58) Field of Classification Search .............. 297/391, 297/216.12, 406, 407, 409, 410, 404
  See application file for complete search history.

(56) References Cited

U.S. PATENT DOCUMENTS

| | | | | |
|---|---|---|---|---|
| 3,586,366 A | * | 6/1971 | Patrick ....................... | 297/391 |
| 3,603,642 A | | 9/1971 | Laessker .................... | 297/408 |
| 3,655,241 A | | 4/1972 | Herzer et al. ............... | 297/408 |
| 4,123,104 A | | 10/1978 | Andres et al. .............. | 297/391 |
| 4,190,291 A | | 2/1980 | Korger ....................... | 297/408 |
| 4,191,422 A | | 3/1980 | Inasawa et al. ............. | 297/391 |
| 4,278,291 A | * | 7/1981 | Asai ............................ | 297/391 |
| 4,304,439 A | | 12/1981 | Terada et al. ............... | 297/409 |
| 4,600,240 A | | 7/1986 | Suman et al. ............... | 297/408 |
| 4,657,304 A | | 4/1987 | Heesch et al. .............. | 297/391 |
| 4,682,817 A | | 7/1987 | Freber ........................ | 297/408 |
| 4,685,737 A | | 8/1987 | Deley et al. ................ | 297/408 |
| 4,762,367 A | | 8/1988 | Denton ....................... | 297/409 |
| 4,834,456 A | | 5/1989 | Barros et al. ............... | 297/403 |
| 4,856,848 A | * | 8/1989 | O'Sullivan et al. ......... | 297/391 |
| 4,861,107 A | | 8/1989 | Vidwans et al. ............ | 297/408 |
| 5,145,233 A | | 9/1992 | Nagashima ................. | 297/408 |
| 5,199,765 A | | 4/1993 | Garmendia et al. ......... | 297/391 |
| 6,000,760 A | | 12/1999 | Chung ........................ | 297/408 |
| 6,007,154 A | | 12/1999 | Parker et al. ............... | 297/410 |
| 6,062,644 A | | 5/2000 | Lance ......................... | 297/410 |
| 6,082,817 A | * | 7/2000 | Muller ................... | 297/216.12 |
| 6,471,296 B1 | | 10/2002 | Lance ......................... | 297/410 |
| 6,499,805 B1 | | 12/2002 | Watadani .................... | 297/408 |
| 6,533,359 B1 | | 3/2003 | Holstensson ................ | 297/391 |
| 6,623,073 B1 | * | 9/2003 | Schafer et al. .......... | 297/216.12 |
| 6,719,373 B1 | | 4/2004 | Zimmermann .............. | 297/410 |
| 6,761,403 B1 | * | 7/2004 | Pal et al. ................ | 297/216.12 |
| 6,805,411 B1 | * | 10/2004 | Gramss et al. .............. | 297/408 |
| 6,983,995 B1 | * | 1/2006 | Veine et al. ................. | 297/391 |
| 2001/0028191 A1 | | 10/2001 | Lance ......................... | 297/410 |

FOREIGN PATENT DOCUMENTS

EP  0 352 234  1/1990

(Continued)

*Primary Examiner*—Milton Nelson, Jr.
(74) *Attorney, Agent, or Firm*—Bill Panagos

(57) ABSTRACT

An infinitely adjustable head restraint assembly that includes a head restraint adapted for movement between a first position and a second position relative to a seatback of a vehicle seat assembly. The head restraint assembly also includes at least one biasing member that biases the head restraint away from the first position toward the second position. Furthermore, the head restraint assembly includes a retainer mechanism operable to retain the head restraint in any position between the first position and the second position and operable to release the head restraint for movement between the first position and the second position. The head restraint assembly can be incorporated in a vehicle seat assembly.

20 Claims, 2 Drawing Sheets

FOREIGN PATENT DOCUMENTS

| | | |
|---|---|---|
| GB | 2161702 | 1/1986 |
| GB | 2 240 920 | 8/1991 |
| JP | 5-329032 | 12/1993 |
| JP | 2000060678 | 8/1998 |

* cited by examiner

INFINITELY ADJUSTABLE HEAD RESTRAINT ASSEMBLY FOR A VEHICLE SEAT ASSEMBLY

BACKGROUND OF THE INVENTION

1. Field of the Invention

The present invention relates, generally, to a head restraint, and more specifically to an infinitely adjustable head restraint assembly for a vehicle seat assembly.

2. Description of the Related Art

Conventional vehicle seat designs of the type commonly found in the related art typically include a seatback assembly, a lower seat assembly, recliner mechanism, manual or power adjustment mechanism for adjusting a number of positions of either the seatback or lower seat assemblies, as well as a number of safety features including occupant restraint devices such as seatbelts.

In the context of vehicle seating design, there is an ongoing effort to provide safety mechanisms that reduce the chance of injury to the passenger's head and neck region. For instance, in the event of a rear end vehicular collision, the occupant's torso is forced against the seatback, and the occupant's neck and head region moves relative to the torso, causing a relative angular displacement between the chest and neck and head region of the occupant. Depending on the force of the rear end collision, this angular displacement can be quickly closed by movement of the neck and head region of the passenger toward the head restraint in an event commonly known as "whiplash." Various head restraint assemblies have been included in vehicle seats to reduce whiplash.

Some head restraints are movable such that the head restraint can be variably positioned. For instance, some head restraints can be raised and lowered, adjusted forward and rearward, and/or tilted relative to the seatback such that the head restraint is in a position to better support the occupant. Some head restraints are manually adjusted, while other head restraints include a powered adjustment means that automatically moves the head restraint in a variety of directions.

Although adjustable head restraints have worked for their intended purpose, certain disadvantages remain. For instance, some head restraints are adjusted manually with both hands, and such adjustment can be inconvenient, especially for those who wish to adjust the head restraint while driving. Some head restraints are adjusted automatically, such as with an electric motor, but such systems typically include complicated and expensive components. Also, some head restraints can only be positioned in a first position, a second position, and a limited number of intermediate positions between the first and second positions, and as such, the occupant may not be able to move the head restraint to a desired position. Accordingly, there remains a need for a head restraint assembly that can be automatically and conveniently adjusted in a first position, a second position, and infinitely between the first and second positions, and which utilizes simple and inexpensive components for adjustment of the head restraint.

SUMMARY OF THE INVENTION

The disadvantages of the related art are overcome in an infinitely adjustable head restraint assembly that includes a head restraint adapted for movement between a first position and a second position relative to a seatback of a vehicle seat assembly. The head restraint assembly also includes at least one biasing member that biases the head restraint away from the first position toward the second position. Furthermore, the head restraint assembly includes a retainer mechanism operable to retain the head restraint in any position between the first position and the second position and operable to release the head restraint for movement between the first position and the second position. The head restraint assembly can be incorporated in a vehicle seat assembly.

The head restraint assembly allows automatic adjustment of the position of the head restraint for improved support of the head and neck area of the occupant of the vehicle seat assembly. The head restraint can be infinitely adjusted between the first and second position such that the user can configure the head restraint in a desired position. Also, the head restraint can be automatically positioned with one hand for added convenience. Furthermore, the head restraint assembly advantageously incorporates relatively inexpensive components.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
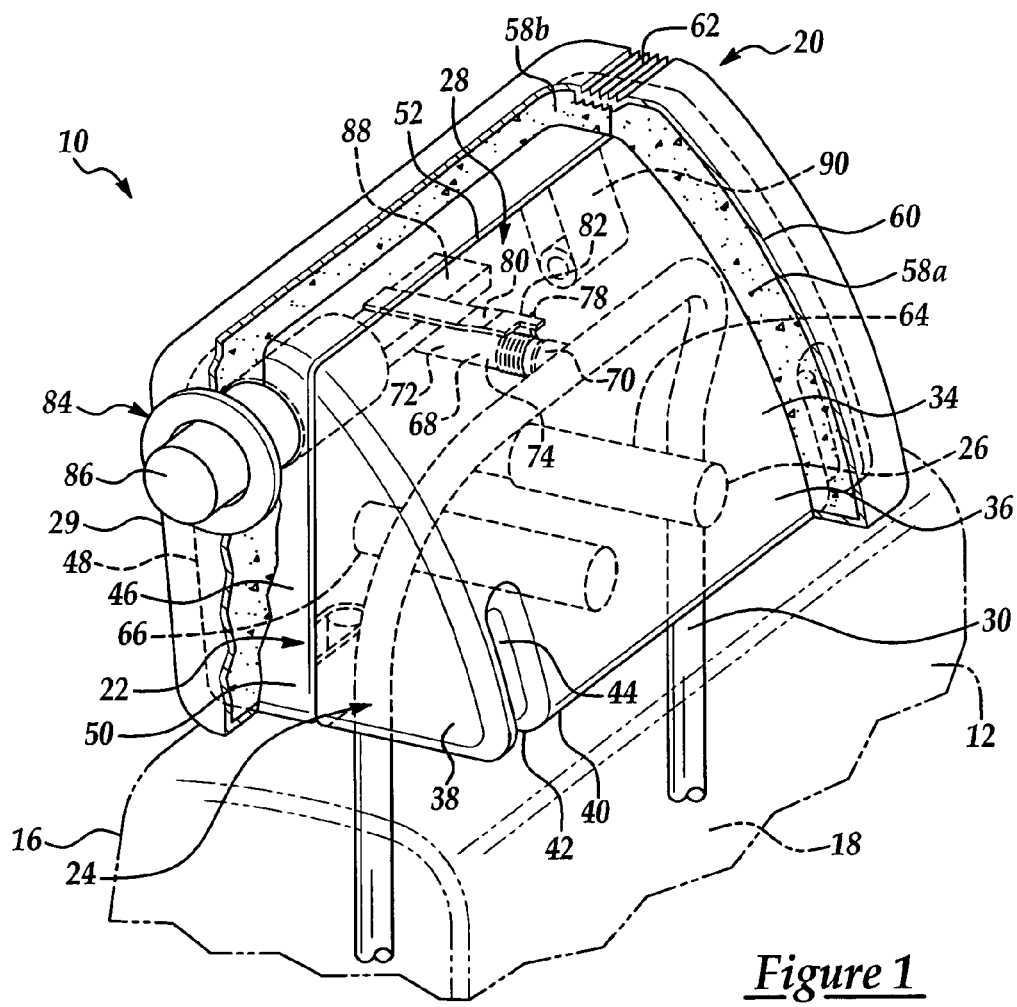
FIG. 1 is a perspective view of a vehicle seat assembly with an infinitely adjustable head restraint assembly of the present invention wherein the head restraint is illustrated in a first position.
Figure 2:
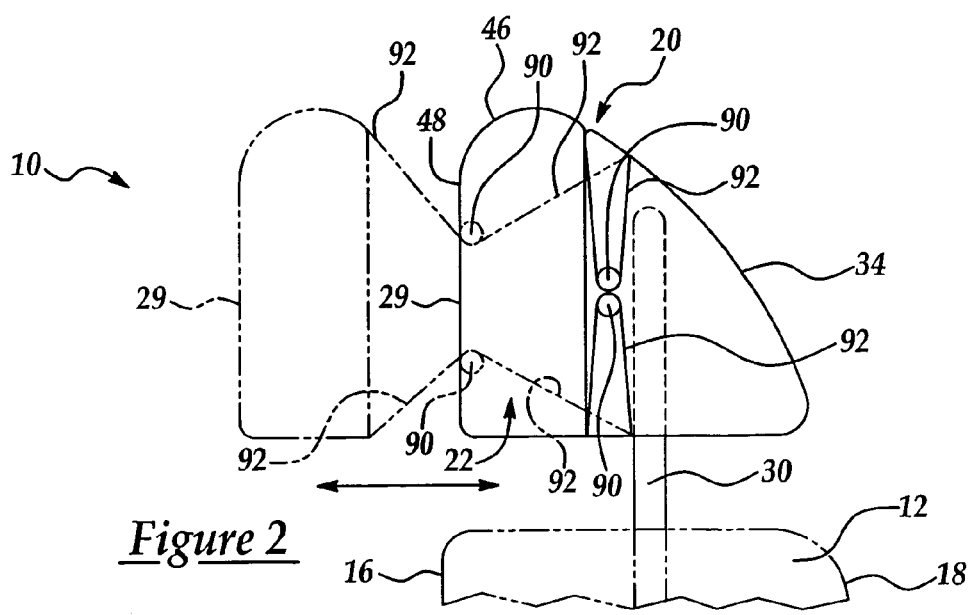
FIG. 2 is a schematic illustration of the infinitely adjustable head restraint assembly of FIG. 1.
Figure 3:
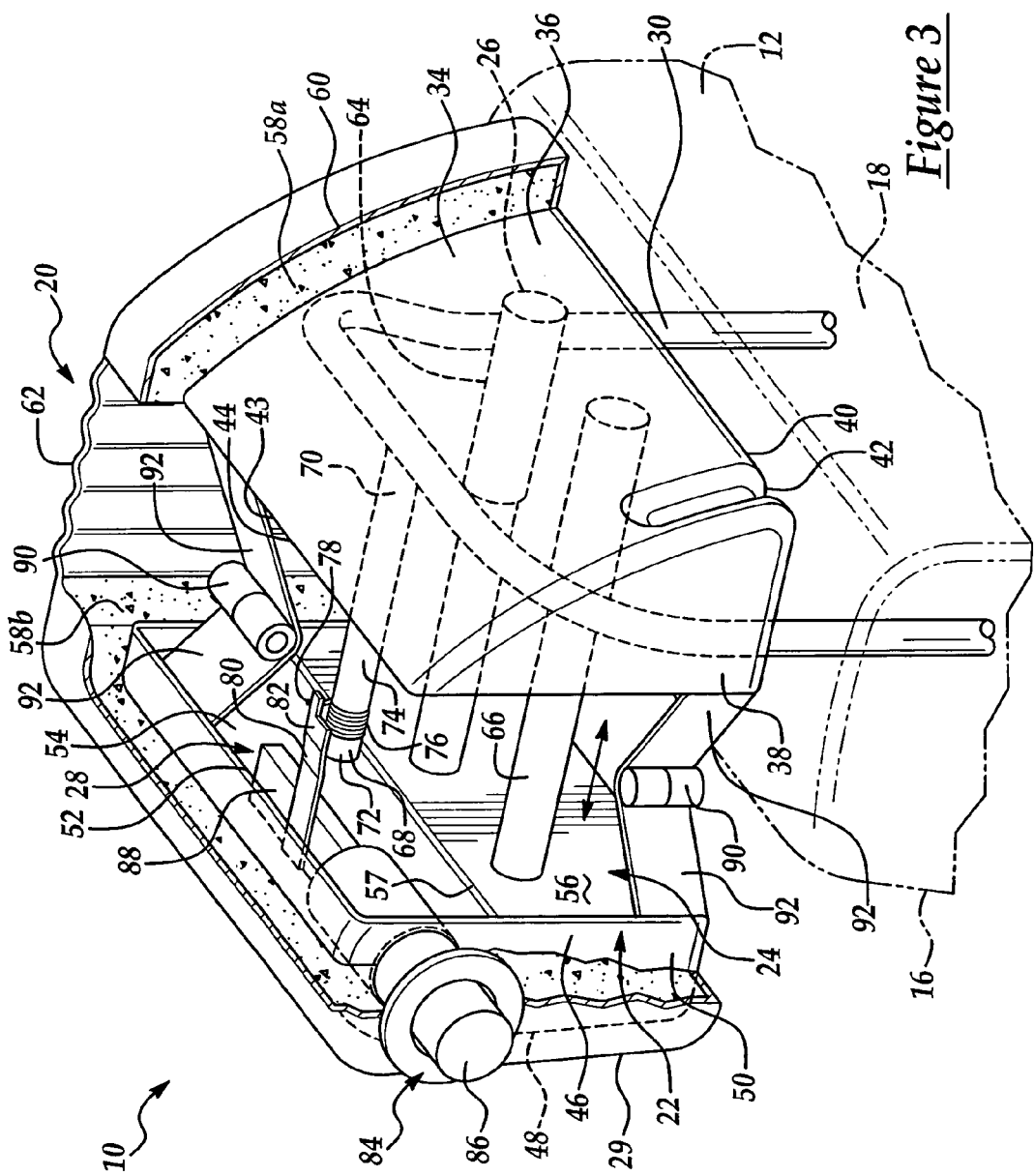
FIG. 3 is a perspective view of the vehicle seat assembly of FIG. 1 wherein the head restraint is illustrated in a second position.

Referring now to the drawings, where like numerals are used to designate like structure throughout the figures, a vehicle seat assembly is generally indicated at 10 in FIGS. 1–3. The vehicle seat assembly 10 includes a seatback, generally indicated at 12. The vehicle seat assembly 10 also includes a lower seat assembly (not shown) that is operatively attached to the seatback 12. The seatback 12 and the lower seat assembly can be mounted within a vehicle (not shown) in any suitable manner. The vehicle seat assembly 10 defines a front side 16 and a rear side 18. The seatback 12 and lower seat assembly, in combination, are adapted to support an occupant within the vehicle.

The vehicle seat assembly 10 also includes an infinitely adjustable head restraint assembly, which is generally indicated at 20. The head restraint assembly 20 includes a head restraint 22 that is adapted for movement between a first position (FIG. 1) and a second position (FIG. 3) relative to the seatback 12 as will be described in greater detail below.

The head restraint assembly 20 also includes at least one biasing member 26 that biases the head restraint 22 away from the first position and toward the second position as will be described in greater detail below. The actuation assembly 24 also includes a retainer mechanism, generally indicated at 28. The retainer mechanism 28 is operable to retain the head restraint 22 in any position between the first position and the second position, and the retainer mechanism 28 is also operable to release the head restraint 22 for movement between the first position and the second position as will be described in greater detail below.

The infinitely adjustable head restraint assembly 20 allows the head restraint 22 to be automatically moved into any desired position between the first and second position for improved support of the head and neck area of the occupant as will be described in greater detail below. In one embodiment, the front side 29 of the head restraint 22 moves away from the rear side 18 of the seat assembly 10 as the head restraint 22 moves away from the first position and toward the second position, and the front side 29 of the head restraint 22 moves toward the rear side 18 of the seat assembly 10 as the head restraint 22 moves away from the second position and toward the first position such that the front side 29 can move toward and away from the occupant. Those having ordinary skill in the art will appreciate, however, that the head restraint 22 could be operable to move in any suitable fashion without departing from the scope of the invention. For instance, the head restraint 22 could be operable to move upward away from and downward toward the seatback 12 without departing from the scope of the invention. Furthermore, the head restraint 22 could be operable to tilt relative to the seatback 12 without departing from the scope of the invention.

Referring now to FIGS. 1 and 3, details of the illustrated embodiment of the infinitely adjustable head restraint assembly 20 will now be discussed. The vehicle seat assembly 10 includes an inverted U-shaped bar 30. The U-shaped bar 30 extends outward from the seatback 12. The U-shaped bar 30 is preferably made of a high-strength material. The U-shaped bar 30 interconnects the head restraint assembly 20 and the seatback 12 as will be discussed in greater detail below. Those having ordinary skill in the art will appreciate that the U-shaped bar 30 could have any suitable shape, such as an M-shape without departing from the scope of the invention.

In the embodiment shown, the head restraint 22 includes a mount 34. The mount 34 includes a rear wall 36 and a pair of spaced end walls 38. The rear wall 36 has a bottom edge 40 adjacent the seatback 12, and the rear wall 36 extends upward from seat back 12 and curves toward the front side 16 of the vehicle seat assembly 10. The end walls 38 extend perpendicularly from opposite sides of the rear wall 36 toward the front side 16 of the seat assembly 10. The mount 34 also includes a bottom wall 42 that is fixed to the bottom edge 40 of the rear wall 36 and that extends perpendicularly toward the front side 16 of the seat assembly 10. As such, the rear wall 36, the end walls 38, and the bottom wall 42 collectively define a front edge 43 best shown in FIG. 3, and the mount 34 defines a cavity 44 open toward the front side 16 of the seat assembly 10. The mount 34 is fixed to the U-shaped bar 30 to thereby mount the head restraint 22 to the seatback 12. However, those having ordinary skill in the art will appreciate that the head restraint 22 could be separate from the seatback 12 without departing from the scope of the present invention.

The head restraint 22 also includes an actuating portion 46. The actuating portion 46 includes a front wall 48 and a plurality of sidewalls 50 each fixed about the periphery of the front wall 48. The front wall 48 is generally parallel to the front side 16 of the seat assembly 10. The sidewalls 50 each extend perpendicularly from the front wall 48 toward the rear side 18 of the seat assembly 10. As such, the actuating portion 46 defines a cavity 54 that is open toward the rear side 18 of the seat assembly 10. The sidewalls 50 define a rear edge 52 of the actuating portion 46. The actuating portion 46 also includes a plate 56 (FIG. 3) that extends between the sidewalls 50 and is attached thereto. The plate 56 is attached to the two opposite vertical sidewalls 50, but is attached to only the lower horizontal sidewall 50 so as to define a lip 57 shown in FIG. 3.

It should be appreciated that the mount 34 and the actuating portion 46 can be constructed of any suitable material such as plastic. Also, the mount 34 and the actuating portion can be integrally formed.

The actuating portion 46 of the head restraint 22 is adapted for movement relative to the mount 34 as will be described below. In the first position (FIG. 1) the rear edge 52 of the actuating portion 46 abuts against the front edge 43 of the mount 34 such that the cavity 54 of the actuating portion 46 is in communication with the cavity 44 of the mount 34. In the second position (FIG. 3) the actuating portion 46 is spaced away from the mount 34. As such, the actuating portion 46 moves away from the mount 34 and the head restraint 22 expands in size as the head restraint 22 moves away from the first position and toward the second position. Conversely, the actuating portion 46 moves toward the mount 34 and the head restraint 22 contracts in size as the head restraint 22 moves away from the second position and toward the first position. However, those having ordinary skill in the art will appreciate that the head restraint 22 could move as a unit relative to the seatback 12 without departing from the scope of the invention.

The head restraint 22 also includes at least one foam piece 58 and an outer trim cover 60. In the embodiment shown, a foam piece 58a covers the mount 34 and a separate foam piece 58b covers the actuating portion 46. The trim cover 60 encapsulates the mount 34, the actuating portion 46, and the foam pieces 58a, 58b. The trim cover 60 can be made of any suitable material of the type commonly employed in the related art, such as leather, polyvinyl, or fabric. The trim cover 60 also includes a collapsible section 62 that allows the head restraint to expand and contract when the actuating portion 46 moves.

In the embodiment shown, the biasing members 26 each include a cylinder 64 fixed to the mount 34. The biasing members 26 further include a piston 66 that is slidably mounted within a respective cylinder 64. One end of each piston 66 is also mounted to the plate 56 of the actuating portion 46 of the head restraint 22. The piston 66 is biased outwardly from the cylinder 64 in any suitable manner, such as a spring, hydraulics, pneumatics, and the like. As such, the biasing member 26 biases the actuating portion 46 away from the mount 34. Also, when the actuating portion 46 moves toward the mount 34, each piston 66 slides into the respective cylinder 64 against the biasing force. The biasing members 26 are preferably dampened for controlled movement of the actuating portion 46 away from the mount 34. It should be appreciated that the biasing members 26 could be integral to the head restraint assembly 20. For instance the pistons 66 could be integral to the actuating portion 46, and the cylinders 64 could be integral to the mount 34. It should also be appreciated that the biasing members 26 could be inverted such that the cylinders 64 are attached to the actuating portion 46 and the pistons 66 are attached to the mount 34.

In the embodiment shown, the retainer mechanism 28 mentioned above includes a rod 68. The rod 68 has a first end 70 fixed to the U-shaped bar 30, and a second end 72 extending over the lip 57 of the plate 56 and into the cavity 54 of the actuating portion 46. The rod 68 also includes an outer surface 74. As will be described below, the retainer mechanism 28 grips the rod 68 to retain the head restraint 22, and the retainer mechanism 28 also releases the rod 68 to release the head restraint 22 from movement between the first position and the second position.

The retainer mechanism 28 also includes a gripping member 76 that selectively grips and releases the rod 68. For instance, in the embodiment shown, the gripping member 76 is a torsion spring that is at least partially wrapped around the outer surface 74 of the rod 68, and the rod 68 is larger than the internal diameter of the torsion spring such that the torsion spring is biased to grip the outer surface 74 of the rod 68. The torsion spring includes an end 78, and by moving the end 78 tangentially away from the rod 68, the torsion spring enlarges to release its grip from the rod 68. The opposite end (not shown) of the spring can be fixed to the actuating portion 46 such that the spring moves with the actuating portion 46.

The retainer mechanism 28 also includes an abutment member 80 that is operable to contact and move the end 78 to enlarge the torsion spring and release its grip from the rod 68. In the embodiment shown, the abutment member 80 is a rectangular shaft with an end 82 positioned adjacent the end 78 of the torsion spring. The end 78 of the torsion spring could also be attached to the abutment member 80.

The head restraint assembly 20 further includes a control device, generally indicated at 84, in FIGS. 1 and 3. The control device 84 is operable to move the abutment member 80 against the end 78 of the gripping member 76 in response to an input from a user (not shown). In the embodiment shown, the control device 84 includes a button 86 that extends outward from the head restraint 22, the foam pieces 58, and the trim cover 60 such that a user can easily access the button 86. In the preferred embodiment, the button 86 is biased outward from the head restraint assembly 20. The button 86 is operatively attached to a moveable shaft 88, and the shaft 88 is operatively fixed to the abutment member 80.

Thus, assuming the actuating portion 46 of the head restraint 22 is in the first position shown in FIG. 1, a user can press the button 86 to move the shaft 88, thereby moving the abutment member 80. The end 82 of the abutment member 80 in turn contacts and moves the end 78 of the gripping member 76, which causes the gripping member 76 to enlarge, such that the gripping member 76 releases its grip from the rod 68. The pistons 66 of the biasing members 26 push against the plate 56 to thereby move the actuating portion 46 away from the first position and toward the second position shown in FIG. 3. When the button 86 is released by the user, the shaft 88 moves the abutment member 80 away from the end 78 of the gripping member 76 such that the gripping member 76 grips the rod 68, thereby retaining the actuating portion 46 against the biasing force supplied by the biasing members 26. To move the actuating portion 46 away from the second position (FIG. 3) and toward the first position (FIG. 1), the button 86 is depressed, and force is applied with the user's head, for example, to the head restraint 22 against the biasing force of the biasing members 26. When the desired position is reached, the user releases the button 86. Accordingly, the actuating portion 46 can be positioned anywhere between the first and second position as desired by the user. Advantageously, the head restraint 22 can be moved automatically using one hand to press the button 86, thereby allowing users to move the head restraint 22 while driving, if necessary.

In the embodiment shown, the head restraint assembly 20 further includes at least one stabilizing member 90 shown in FIGS. 1–3. The stabilizing members 90 are operable to maintain linear movement of the head restraint 22 relative to the seat back 12 of the vehicle seat assembly 10 as the head restraint 22 moves between the first position and the second position. In the embodiment shown, for instance, the stabilizing members 90 are each hinges with a plurality of legs 92 (FIGS. 2 and 3). One of the legs 92 of each stabilizing member 90 is pivotally mounted to the actuating portion 46, and the other leg 92 is pivotally mounted to the mount 34 of the head restraint 22. As shown in FIG. 2, the stabilizing members 90 are enclosed by the head restraint 22 when the actuating portion 46 is positioned in the first position, and the stabilizing members 90 swing outward from the head restraint 22 and between the actuating portion 46 and the mount 34 as the actuating portion 46 moves toward the second position. The stabilizing members 90 cause the actuating portion 46 to resist pivoting or tilting motion of the actuating portion 46 relative to the mount 34 and seat back 12, and generally maintain linear movement of the actuating portion 46 toward and away from the mount 34. In the embodiment shown in FIG. 3, there is a plurality of stabilizing members 90 (although some are not illustrated for clarity). The stabilizing members 90 are disposed perpendicular to each other to better resist pivoting or tilting motion of the actuating portion 46 relative to the mount 34 and seat back 12.

In summary, the head restraint assembly 20 allows automatic adjustment of the position of the head restraint 22 for improved support of the head and neck area of the occupant of the vehicle seat assembly 10. The head restraint 22 can be infinitely adjusted between the first and second position such that the user can configure the head restraint 22 in a desired position. Also, the head restraint 22 can be automatically positioned with one hand for added convenience. Furthermore, the head restraint assembly 20 advantageously incorporates relatively inexpensive components.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. An infinitely adjustable head restraint assembly for a vehicle seat assembly having a seatback, said head restraint assembly comprising:
    a head restraint adapted to be infinitely adjustable between a first position and a second position relative to the seatback;
    at least one biasing member that biases said head restraint away from the first position toward the second position; and
    a retainer mechanism manually operable to retain said head restraint in any position between the first position and the second position and manually operable to release said head restraint for movement between the first position and the second position.

2. An infinitely adjustable head restraint assembly as set forth in claim 1 wherein said retainer mechanism includes a rod, and wherein said retainer mechanism grips said rod to retain said head restraint and releases said rod to release said head restraint for movement between the first position and the second position.

3. An infinitely adjustable head restraint assembly as set forth in claim 2 wherein said retainer mechanism includes a gripping member that selectively grips and releases said rod, said gripping member biased to grip said rod.

4. An infinitely adjustable head restraint assembly as set forth in claim 3 wherein said gripping member is a torsion spring, wherein said torsion spring grips an outer surface of said rod to retain said head restraint, and wherein said torsion spring enlarges to release said rod, thereby releasing said head restraint for movement between the first position and the second position.

5. An infinitely adjustable head restraint assembly as set forth in claim 4 wherein said torsion spring includes an end and said retainer mechanism includes an abutment member operable to contact and move said end to enlarge said torsion spring.

6. An infinitely adjustable head restraint assembly as set forth in claim 5 further including a control device operable to move said abutment member against said end of said torsion spring in response to an input from a user.

7. An infinitely adjustable head restraint assembly as set forth in claim 1 wherein the vehicle seat assembly defines a rear side, and said head restraint is adapted to move away from the rear side as said head restraint moves from the first position toward the second position.

8. An infinitely adjustable head restraint assembly as set forth in claim 1, wherein said biasing member is dampened.

9. An infinitely adjustable head restraint assembly as set forth in claim 1 further comprising at least one stabilizing member operable to maintain linear movement of said head restraint relative to the seatback of the vehicle seat assembly as said head restraint moves between the first position and the second position.

10. An infinitely adjustable head restraint assembly as set forth in claim 1 wherein said head restraint includes an actuating portion and a mount, said actuating portion of said head restraint adapted for movement relative to said mount such that said head restraint expands as said head restraint moves away from the first position and toward the second position, and such that said head restraint contracts as said head restraint moves away from the second position and toward the first position.

11. A vehicle seat assembly comprising:
 a seatback;
 a head restraint adapted to be infinitely adjustable between a first position and a second position relative to said seatback;
 at least one biasing member that biases said head restraint away from the first position toward the second position; and
 a retainer mechanism manually operable to retain said head restraint in any position between the first position and the second position and manually operable to release said head restraint for movement between the first position and the second position.

12. A vehicle seat assembly as set forth in claim 11 wherein said retainer mechanism includes a rod, and wherein said retainer mechanism grips said rod to retain said head restraint and releases said rod to release said head restraint for movement between the first position and the second position.

13. A vehicle seat assembly as set forth in claim 12 wherein said retainer mechanism includes a gripping member that selectively grips and releases said rod, said gripping member biased to grip said rod.

14. A vehicle seat assembly as set forth in claim 13 wherein said gripping member is a torsion spring, wherein said torsion spring grips an outer surface of said rod to retain said head restraint, and wherein said torsion spring enlarges to release said rod, thereby releasing said head restraint for movement between the first position and the second position.

15. A vehicle seat assembly as set forth in claim 14 wherein said torsion spring includes an end and said retainer mechanism includes an abutment member operable to contact and move said end to enlarge said torsion spring.

16. A vehicle seat assembly as set forth in claim 15 further including a control device operable to move said abutment member against said end of said torsion spring in response to an input from a user.

17. A vehicle seat assembly as set forth in claim 11 further defining a rear side, wherein said head restraint is adapted to move away from said rear side as said head restraint moves from the first position toward the second position.

18. A vehicle seat assembly as set forth in claim 11, wherein said biasing member is dampened.

19. A vehicle seat assembly as set forth in claim 11 further comprising at least one stabilizing member operable to maintain linear movement of said head restraint relative to said seatback as said head restraint moves between the first position and the second position.

20. A vehicle seat assembly as set forth in claim 11 wherein said head restraint includes an actuating portion and a mount, said actuating portion of said head restraint adapted for movement relative to said mount such that said head restraint expands as said head restraint moves away from the first position and toward the second position, and such that said head restraint contracts as said head restraint moves away from the second position and toward the first position.

* * * * *